United States Patent [19]

Jabsen

[11] 4,208,248

[45] Jun. 17, 1980

[54] FUEL ASSEMBLY WITH A REMOVABLE END FITTING

[75] Inventor: Felix S. Jabsen, Lynchburg, Va.

[73] Assignee: The Babcock & Wilcox Company, New Orleans, La.

[21] Appl. No.: 845,767

[22] Filed: Oct. 26, 1977

[51] Int. Cl.² ........................... G21C 3/30; G21C 7/08
[52] U.S. Cl. ...................................... 176/78; 176/35; 176/36 C; 176/76
[58] Field of Search ............... 176/30, 35, 36 R, 36 C, 176/5 W, 78, 76; 214/18 N; 294/86 A

[56] References Cited

U.S. PATENT DOCUMENTS

| | | | |
|---|---|---|---|
| 3,770,583 | 11/1973 | Klumb | 176/76 |
| 3,862,884 | 1/1975 | Jabsen | 176/78 |
| 3,953,287 | 4/1976 | Long | 176/78 |
| 4,030,975 | 6/1977 | Anthony | 176/76 |
| 4,045,287 | 8/1977 | Santen | 176/78 |

Primary Examiner—Samuel W. Engle
Assistant Examiner—Donald P. Walsh
Attorney, Agent, or Firm—R. J. Edwards; D. Anthony Gregory; J. M. Maguire

[57] ABSTRACT

A typical embodiment of the invention provides a nuclear fuel assembly lock structure for control rod guide tubes. Illustratively, a sleeve telescopes over an end portion of a control rod guide tube which bears against an internal shoulder of the tube. The upper end of the sleeve protrudes beyond the control rod guide tube spider and is locked in place by means of a resilient cellular lattice or lock that is seated in a mating groove in the outer surface of the sleeve. A special tool is provided for disengaging the entire lock structure, washer, spider, spring and grill from the end of the fuel assembly in order to enable these components to be removed in an assembled state and subsequently replaced on the fuel assembly after inspection and repair.

3 Claims, 9 Drawing Figures

FIG. 2
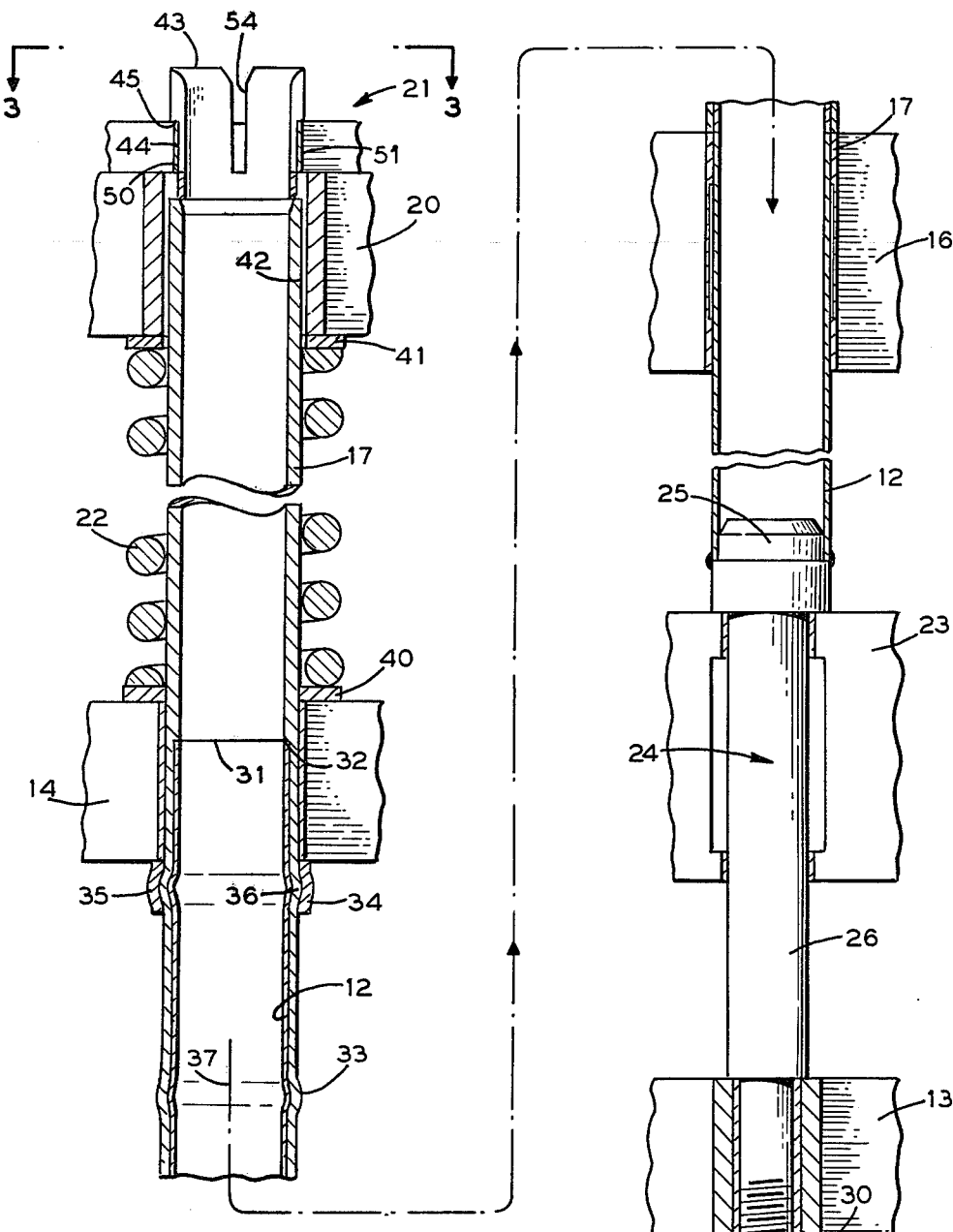
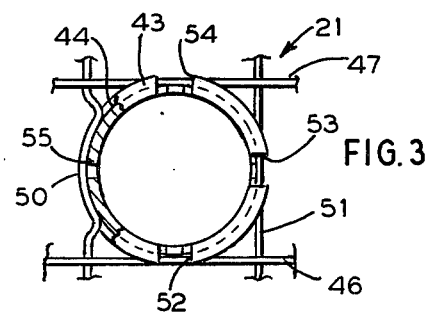
FIG. 3

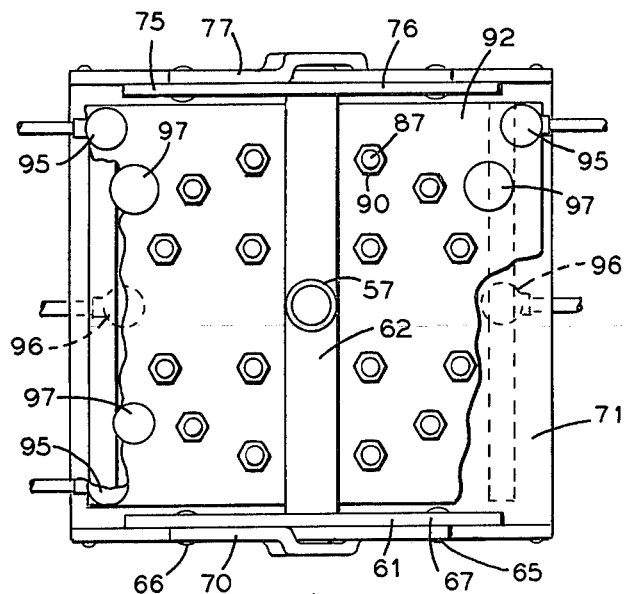
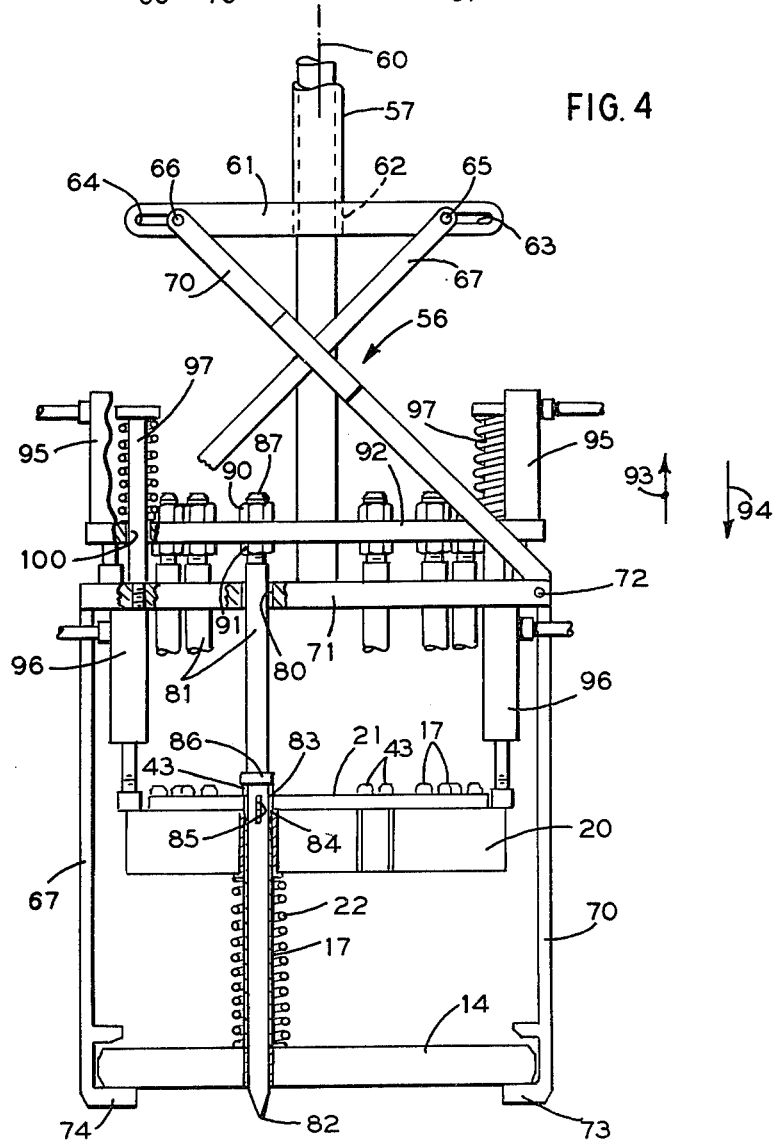

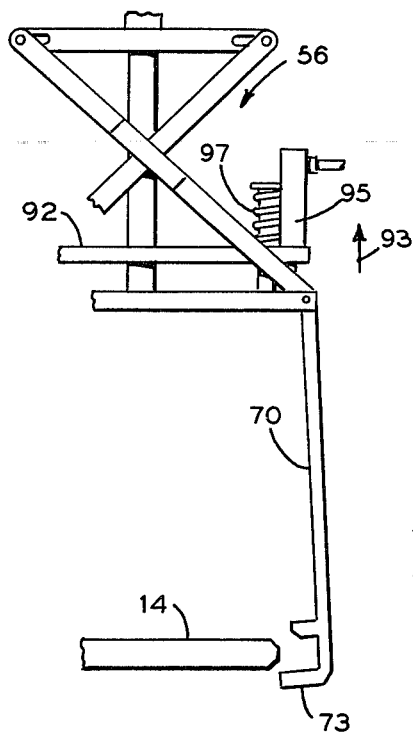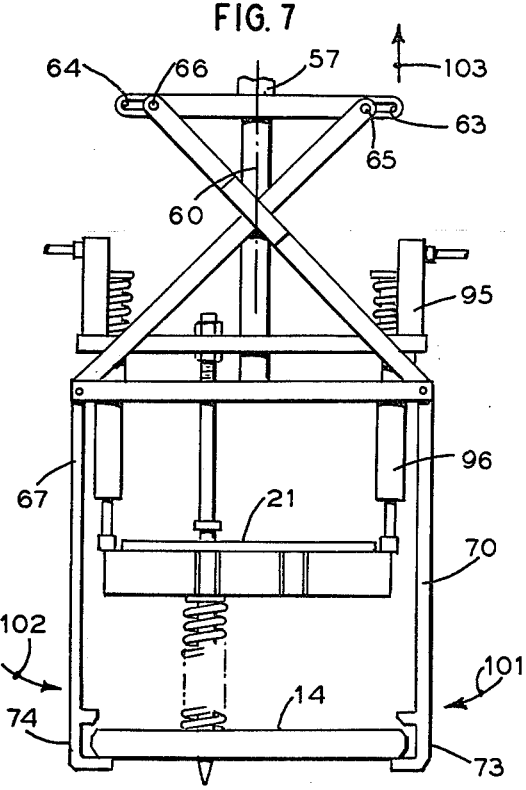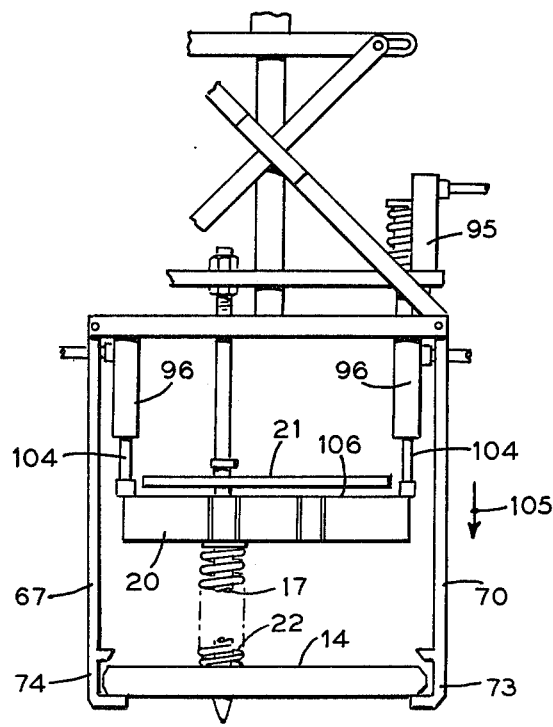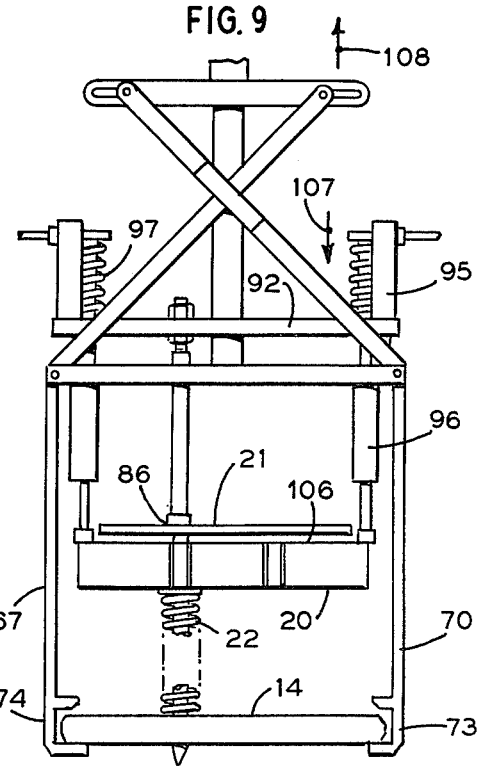

FUEL ASSEMBLY WITH A REMOVABLE END FITTING

BACKGROUND OF THE INVENTION

1. Field of the Invention

This invention relates to fuel assemblies for use in nuclear reactors and, more particularly, to locking techniques for the end fittings and control rod guide tubes in a nuclear fuel assembly, and the like.

2. Description of the Prior Art

To produce useful power from a nuclear reactor it is necessary to assemble fissionable material in a concentration that is sufficient to sustain a continuous sequence of neutron-induced fissions. Frequently, this concentration is attained by sealing uranium dioxide pellets in long, slender hollow rods. These rods, when filled with a charge of nuclear fuel and sealed at the ends, are called "fuel rods".

The fuel rods are arranged in a generally cylindrical array, or reactor core, to form the required concentration of fissionable material. In order to extract the heat generated in these fuel rods through the fission process, the fuel rods usually are spaced laterally from each other and water is pumped under pressure through the reactor core. The water absorbs the fission process heat and transfers this heat to secondary cooling water. The secondary cooling water rises into steam that is used to drive power generating turbine machinery.

In the reactor core, the radiation, pressures, temperatures and cooling water flow velocities create an environment that is quite hostile to the structural integrity of the reactor core. To cope with this environment, it has been customary to arrange the fuel rods that comprise the reactor core into a number of groups each of about two hundred fuel rods. These groups are frequently called fuel assemblies.

To enhance the structural integrity of each of the fuel assemblies and to stabilize the fuel rods in the assembly, it is common to mount the fuel rods between "end fittings" and to engage the mid-portions of each of the rods in the fuel assembly by means of cellular grid structures that are positioned at predetermined intervals along the lengths of the rods.

The structure of the fuel assembly, moreover, is not restricted to fuel rods, end fittings and grids. As a general rule one or more control rod guide tubes also are accommodated in the usual fuel assembly. Typically, to control the power generated in a nuclear reactor it is customary to add neutron absorbing materials to the reactor core. These materials have the effect of decreasing the fission activity within the core and thereby decreasing the power output from the reactor. As might be expected, there are a number of ways in which these neutron absorbing materials are introduced into the reactor core. Quite frequently, for example, the neutron absorbing materials are loaded into control rods. These control rods are received in hollow metal control rod guide tubes that extend through the length of the respective fuel element. In these circumstances, the depth of the penetration of the control rods into the associated fuel element determines, to some extent, the level of neutron fission activity and associated power output from the reactor core.

Some fuel assembly designs have a further use for the control rod guide tubes beyond aligning the individual control rods within the respective fuel assembly. Typically in this regard, the control rod guide tubes are often used to space the two end fittings from each other and, essentially, to clamp the fuel rods in proper relative position between these end fittings through enabling the end fittings to engage the extreme ends of the fuel rods.

This foregoing fuel assembly construction produces a rugged, sturdy structure that is able to cope with the forces that characterize a reactor core environment. There is, however, a somewhat countervailing need to provide a fuel assembly structure that can be assembled and dismantled with ease in order to reduce manufacturing costs, improve quality assurance and facilitate inspection and replacement. If it is realized that fuel assemblies, once having been made radioactive, must subsequently be manipulated behind shielding with remote handling equipment, the importance of the need for simple disassembly techniques becomes immediately apparent.

In this respect, the typical fuel element is dismounted by unthreading nuts that connect the control rod guide tubes to the end fittings, releasing one or more springs and, in general, taking the entire fuel assembly apart piece-by-piece. Not only is this a very laborious and expensive practice but it also introduces the possibility that one or more of the smaller fittings might go astray, leading to further lost time and expense, or damage if not discovered.

Thus, there is a clear need for an improved fuel assembly that will, to a large extent, overcome many of these inadequacies that have characterized the prior art.

SUMMARY OF THE INVENTION

An improved fuel assembly in accordance with the principles of the invention is characterized by a sleeve that engages one end of a control rod guide tube, essentially fixing the guide tube to one of the fuel assembly end structures. An end of the sleeve protrudes above the surface of the end fitting. The outer surface of the sleeve has a peripheral groove that engages the resilient sides of a cellular grid or lattice shaped lock. This lock fixes the sleeve in position between the various elements that comprise the end fitting, thereby eliminating a profusion of costly and potentially troublesome nuts, threaded studs and the like that frequently are employed in the fuel assemblies that are typical of the prior art.

To dismount the end fitting from the fuel assembly in accordance with the principles of the invention, a special grapple has jaws that engage a portion of the end fitting. The jaws first clamps the upper grill that supports the ends of the control rod guide tubes and their respective sleeves. The spider which engages the control rod guide tube sleeves then is pressed against the springs that circumscribe these sleeves in order to establish some degree of longitudinal clearance between the spider and the lock mechanism. After this clearance is established individual tools are pressed into the respective open, protruding ends of each of the sleeves to engage exposed portions of the grid-shaped lock. The tools press these sides out of the groove, so engage the lock that the lock will be withdrawn from the sleeve when the grapple is withdrawn from the end of the fuel assembly. This permits the upper end fitting to be removed as a unit that captures the components which are associated with the end fitting as an assembled unit, while leaving the control rod guide tubes and the associated sleeves with the balance of the fuel assembly. In this way, end fitting components that are captured by the grapple in this manner subsequently can be replaced intact on the fuel assembly structure without indulging in the cumbersome and expensive remote manipulator detailed disassembly and assembly of scores of small parts that has characterized the prior art.

Thus, the invention provides techniques for reducing the number of parts required for fuel assembly construction, reduces manufacturing costs and simplifies quality assurance and inspection problems.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

FIG. 2 is a front elevation in full section of a control rod guide tube structure for use in connection with the structure that is shown in FIG. 1;

FIG. 3 is a plan view in partial section of the control rod guide tube structure that is shown in FIG. 2 taken along the line 3—3 of FIG. 2;

FIG. 4 is a front elevation of a grapple and tool engaging a portion of the fuel assembly that is shown in FIG. 1;

FIG. 5 is a plan view in broken section of the grapple that is shown in FIG. 4;

FIG. 6 is a schematic drawing of a portion of the grapple in an initial operational position;

FIG. 7 is a schematic drawing of a portion of the grapple in another operational position;

FIG. 8 is a schematic drawing of a portion of the grapple in still another operational position; and FIG. 9 is a schematic drawing of a portion of the grapple after the lock has been disengaged.

DETAILED DESCRIPTION OF THE PREFERRED EMBODIMENTS

Figure 1:
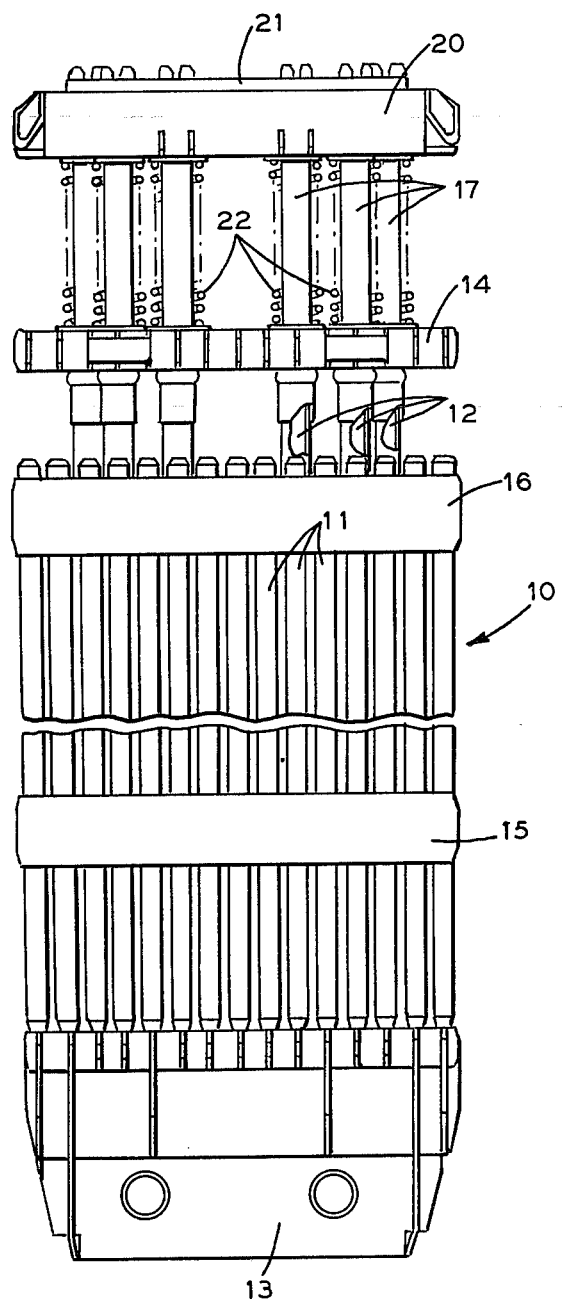
FIG. 1 is a front elevation in part section of a typical fuel assembly that embodies principles of the invention.

As shown in FIG. 1, an illustrative fuel assembly 10 comprises an array of more than two hundred fuel rods 11. It will be recalled in this respect, that the fuel rods 11 are made from long, slender, thin-walled tubes that enclose pellets of uranium dioxide or other suitable nuclear fuel, and that these fuel rods are grouped together within the fuel assembly 10 with the longitudinal axes of the fuel rods in general parallel alignment. Control rod guide tubes 12 are nested within the fuel assembly 11 amongst and in parallel with the fuel rods. The control rod guide tubes 12 each are hollow, thin-walled tubes that extend through the entire fuel assembly 10 parallel to the longitudinal axis of the fuel assembly.

A lower end support fitting 13 that is transversely disposed relative to the longitudinal axes of the fuel rods 11 engages the abutting ends of the fuel rods. As described subsequently in more complete detail, the control rod guide tubes 12 pass through the end fitting 13 in order to secure the end fitting to the fuel assembly structure.

Ends of the control rod guide tubes 12 protrude above the plane established by the sealed ends of the fuel rods 11. These protruding ends of the control rod guide tubes 12 terminate, as shown in FIG. 2, within the confines of a transversely disposed grill 14. The grill 14 is assembled from a parallel array of generally flat, slotted plates that are meshed with mating slots in a perpendicular array of essentially flat plates in order to form a cellular grill structure. The parallel grouping of the fuel rods 11 and the control rod guide tubes 12 is established and stabilized by means of transversely disposed grid structures 15, similar in construction to the grill 14 described above and through which the fuel rods and guide tubes extend. Toward the ends of the fuel rods 11 that are close to the protruding portions of the control rod guide tubes, however, a transversely disposed upper grid 16 is positioned. The upper grid 16 has a somewhat greater depth in the direction of the longitudinal axes of the fuel rods 11 than the grid structures 15 in order to enhance the structural integrity of this portion of the fuel assembly.

In accordance with a feature of the invention a parallel array of hollow cylindrical sleeves 17 telescope over the respective protruding ends of the control rod guide tubes 12 in order to extend from within the confines of the upper grid 16 through the grill 14, through a transversely disposed spider 20 and an immediately superjacent control rod guide tube assembly lock 21. Spring means, such as individual coil springs 22, each associated with a respective one of the sleeves 17 are interposed in a biasing relationship between the grill 14 and the spider 20 in order to provide some means for compensating and absorbing movement of the fuel element 10 in the direction of the longitudinal axes of the fuel rods 11. Note that in the illustrative embodiment of the invention shown in FIG. 2 that the sleeve 17 is in general axial alignment with the guide tube 12, and that the sleeve serves as a guide for the coil spring 22. The coil spring 22, moreover, also has a longitudinal axis that generally coincides with the longitudinal axis of the guide tube 12.

Attention is invited to FIG. 2 for a more detailed appreciation of the novel features of this invention that characterize the invention. More particularly, the control rod guide tube 12 is secured to a lower grid 23 by means of a bolt structure 24. The bolt structure 24 has a head 25 that is received within the adjacent open end of the control rod guide tube 12. A bolt shank 26 extends through the lower grid 23 in order to protrude from the end support fitting 13. The protruding portion of the shank 26 is threaded in order to receive a fastening nut 27. A nut retainer 30 is interposed between the end fitting and the nut 27 in order to prevent the nut from working loose and becoming disengaged from the fuel assembly.

As shown in FIG. 2, the control rod guide tube 12 extends through the main portion of the fuel assembly and through an upper grid 16. Within the upper grid 16 the guide tube 12 is telescoped within the sleeve 17, open end portion 31 of the control rod guide tube 12 abutting and bearing against a flange or shoulder 32 that is formed within the inner surface of the sleeve 17. The shoulder 32 in the sleeve 17 transfers compression loads directly to the guide tube in the manner described subsequently in more complete detail.

Through the lengths of the control rod guide tube 12 and the sleeve 17 that are coextensive protrusions or "dimples" 33 are swaged or otherwise suitably formed in the control rod guide tube 12 and the sleeve 17 in order to hold the sleeve and the guide tube together and form a tight joint. Immediately below the grill 14, circumscribing a portion of the sleeve 17 and bearing against a transverse surface of the grill 14 is a ring shaped collar 34. As shown, the collar 34 and the encircled portions of the sleeve 17 and the control rod guide tube 12 also are provided with protrusions or dimples 35, 36 that have been swaged or otherwise formed in the materials in order to position the collar 34 properly relative to the balance of the fuel assembly structure and to permit the collar to sustain loads imposed in the direction of control rod guide tube longitudinal axis 37 and to transfer these loads between the grill 14 and the combination sleeve 17 and control rod guide tube 12.

A washer 40 rests upon the transverse surface of the grill 14 that is opposite from the transverse grill surface that engages the collar 34. The coil spring 22, as illustrated in FIG. 2, is mounted on the washer 40 and encloses a portion of the sleeve 17 that protrudes above the grill 14. The longitudinal axis of the coil spring 22 generally coincides with the longitudinal axis 37 in order to press against a further washer 41. Thus, the coil spring 22 interposed between the grill 14 and the spider assembly 20, respectively biases the grill and spider assembly against the collar 34 and the lock 21.

Illustratively, the washer 41 is in engagement with the cellular spider assembly 20. As shown, the sleeve 17 is received within a cellular recess 42 in the spider 20 with sufficient clearance between the sleeve and the walls of the spider recess 42 to permit the spider and the sleeve to move relative to each other in the direction of the longitudinal axis 37.

A terminal portion 43 of the sleeve 17 protrudes above the spider 20 in order to engage the lock 21. To engage the lock 21, the outer surface of the portion 43 is provided with a circumferential groove 44 that forms a protruding shoulder 45 which serves to engage edges of the lock 21. Perhaps, as best shown in FIG. 3, the lock 21 is assembled from an array of resilient parallel plates 46, 47 that are meshed and interlock with similarly resilient plates 50, 51 that are generally perpendicular to the plates 46, 47 at the respective lines of intersection to form a cellular grid structure. As shown, the separation between the parallel plates 46, 47 is less than the maximum outside diameter of the groove 44 that is formed in the portion 43.

The plate 50 has a generally arcuate shape that conforms to and bears against a segment of the grooved surface of the terminal sleeve portion 43. The companion plate 51, however, has a plane profile that permits part of an edge of this plate to engage the shoulder 45 (FIG. 2). In this manner, all of the control rod guide tubes 12 that are shown in FIG. 1 are locked together as a single unit.

Best shown in FIGS. 2 and 3, the terminal sleeve portion 43 is provided with four longitudinal slots 52, 53, 54 and 55 that are parallel with the longitudinal axis 37. The slots 52, 53, 54 and 55 each are spaced from the next adjacent slots by about 90° and penetrate the portion 43 to a depth that is at least equal to the combined longitudinal depth of the shoulder 45 and the width of the plates 50, 51.

In accordance with an additional feature of the invention a grapple 56 is shown in FIG. 4. The grapple 56 releases the lock 21 from the control rod guide tube sleeves 17 and also provides a means for installing or removing as one entire unit the complete assembly that comprises the lock 21, the washers 40, 41 the spider 20, the coil springs 22 and the grill 14. To accomplish these results, the grapple 56 is provided with a member 57 that is movable in the direction of longitudinal axis 60.

A transversely disposed linkage 61 is secured through a cross piece 62 (FIG. 5) to the vertically movable member 57. The end portions of the linkage 61 (FIG. 4) have slots 63, 64 which receive respective pins 65, 66. The pins 65, 66 are transversely movable within the respective slots in order to enable two jaws 67, 70 that are pivotally connected to a transversely disposed tool frame 71 to move in a scissors-like manner. Thus, pivot 72 joins the jaw 70 to the tool frame 71.

As shown in FIG. 4 the jaw 70 is provided at its extreme end with a clamp 73 that engages a longitudinal edge of the grill 14. In a similar manner, the extreme end of the jaw 67 also is provided with a clamp 74 that is oppositely disposed from the clamp 73 on the jaw 70.

Perhaps best shown in FIG. 4, a companion linkage 75 with pinned and pivoted jaws 76, 77 also are joined by means of the cross piece 62 to the longitudinally movable member 57. This companion structure matches and balances the structural arrangement described above with respect to the jaws 67, 70.

The transversely disposed tool frame 71 also is provided with an array of longitudinally aligned apertures 80 that each accommodate one of a group of tools 81. As illustrated in FIG. 4, the tools 81 are formed from generally cylindrical rods that are longitudinally aligned with the axis 60. Each of the tools 81 has a generally conical end portion 82. The mid-section of the tool 81 has four fins 83, of which only three of these fins are shown in the plane of the drawing. As illustrated, each of the fins 83 are spaced about 90° from the next adjacent fins. Each of the fins 83 has a tapered slope 84 in which the narrow edge of the slope is oriented toward the end portion 82. The tapered slope 84 ends in a generally flat surface 85. The width of each of the fins 83 is slightly less than the transverse width of the individual slots 52, 53, 54, 55 (FIGS. 2 and 3). The transverse depth of each of these fins, however, between the flat surface 85 (FIG. 4) and the adjacent surface of the tool 81 is greater than the corresponding wall thickeness of the terminal sleeve portion 43 as shown in FIGS. 2 and 3.

An annular collar 86 is secured to the tool 81 and spaced longitudinally from the flat surfaces 85 on the fins 83 a sufficient distance to enable the fins when aligned with the respective slots in the terminal sleeve portion 43 to bear against the terminal portion and prevent the flat surfaces 85 of the fins 83 from penetrating the sleeve 17 to a depth greater than the longitudinal protrusion of the slots in the terminal sleeve portion 43 (FIG. 2) above the spider 20.

As illustrated in FIG. 4, the tool 81 has been threaded 87 at the end opposite from the end portion 82 to enable nuts 90, 91 to secure the tool 81 to a transversely disposed plate 92 that is movable in longitudinal directions as indicated by means of arrows 93, 94 under the control of spring biased pneumatic cylinders 95, 96. Thus, depending on the relative activation of the pneumatic cylinders 95, 96, the tools 81, when aligned with respective terminal sleeve portions 43 are driven into the sleeves 17 to a sufficient depth to permit the flat surfaces 85 on the fins 83 to bear against the plates 46, 47 50, 51 (FIGS. 2 and 3). The flat surfaces 83 press these plates in a radially outward direction relative to the longitudinal axis 37 through a distance that is sufficient to permit all of the plates to clear the shoulder 45 that is formed in the terminal sleeve portion 43. In this manner the entire cellular lock 21 is released from its engagement with the sleeves 17 and fixes itself temporarily to the tools 81 in the array of tools.

In operation, and, as perhaps best understood through an examination of FIG. 6 the grapple 56 is aligned with the end fitting to permit the clamps 73 on the jaw 70 (as well as the clamps 74 on the jaws 67, and the clamps on the jaws 76, 77 on the grapple that are not shown in FIG. 6) to be spaced outwardly of the grill 14, but within the same transverse plane as the grill.

During this phase of the operation of the grapple 56, the springs associated with the springs loaded pins 97 are compressed through activation of the air cylinder 95 which moves the plate 92 in the direction of the arrow 93.

As illustrated in FIG. 7, the clamps 73, 74 on the jaws 70, 67, respectively, (as well as the changes on the comparison pair of jaws 76, 77) swing inwardly in the directions indicated by arrows 101, 102 in order to grasp firmly peripheral portions of the grill 14. This inwardly swinging movement of the clamps 73, 74 is achieved through longitudinal movement of the member 57 in the direction of arrow 103. This movement of the member 57, causes the pins 65, 66 to ride within the respective slots 63, 64 toward the longitudinal axis 60. The motion of these pins within the slots compels the jaws 67, 70 to pivot centerclockwise and clockwise, respectively, about the pivot 72 (for the jaw 70) and a similar pivot (not shown in FIG. 7) for the jaw 67.

The next illustrative step in the technique for dismounting the end fitting from the balance of the fuel assembly is shown in FIG. 8. Thus, air cylinders 96 are activated to drive piston rods 104 in the longitudinal directions indicated by means of arrow 105. The exposed ends of the piston rods 104 bear against the adjacent transverse surface of the spider 20. The force applied by the piston rods 104 to the spider 20 overcomes the oppositely directed forces established by means of the coil springs that are received on the sleeves, of which the coil spring 22 and the sleeve 17 in FIG. 8 are illustrative. In response to this new balance of forces the spider 20 also moves in the longitudinal direction of the arrow 105 in order to provide a longitudinal clearance 106 between the spider 20 and the lock 21 to relieve the force that the spider 20 applies to the lock 21.

In a typical embodiment of the invention, the next step in the technique involves movement of the grapple 56 that is best illustrated in FIG. 9. Recall for a moment that the cellular structure of the lock 21 is so designed that the groove 44 (FIG. 2) and the shoulder 45 that is formed in the terminal sleeve portion 43 engage the plates 46, 47, 50, 51 (FIG. 3) that comprise the structure of the cells in the lock 21.

Turning now once more to FIG. 9, the air cylinders 95 are deactivated to enable the coiled springs on the spring loaded pins 97 to release and press the plate 92 in a longitudinal direction as indicated by an arrow 107. Because the recess and shoulders on the sleeves restrain the lock 21 from engaging in any longitudinal movement in the direction of the arrow 107, the tools that are fastened to the plate 92, of which the tools 81 is typical, are pressed through the individual cells in the locks 21 into the respective sleeves 17. The fins 83 that protrude radially from the tools 81 also are driven into mating slots 52, 53, 54, 55 (FIGS. 2 and 3). This longitudinal movement of the tools 81 permits the tapered slope 84 of the pins 83 (FIG. 9) to press the plates 46, 47, 50, 51 on the lock 21 in a radially outward direction in order to disengage these plates from the nested engagement within the annular groove 44 (FIGS. 2 and 3) that is formed in the terminal sleeve portion 43.

In those circumstances, further longitudinal movement of the tools 81 (FIG. 9) in the direction of the arrow 107 under the force of the released springs on the pins 97 is limited only by the braking action of the collars 86 on each of the tools. The collar 86 is so spaced relative to the lock 21 that the plates which form each of the cells in the lock 21 are forced onto the corresponding flat surface 85 of the fins 83. The effect of this engagement between the plates that form the cells on the lock 21 and the flat surfaces 85 of the fins 83 is to press the plates out of engagement with the respective annular grooves 44 (FIGS. 2 and 3) and shoulders 45.

In the next illustrative disassembly step, the entire grapple 56 is moved longitudinally in the direction of arrow 108. The grapple, withdrawn from the balance of the fuel assembly in the foregoing manner, takes with it most of the end fitting components in their proper relative position. Typically, the lock 21, the spider 20, and the grill 14 remain with the grapple 56. The coil springs 22 with their associated washers 40, 41 (FIG. 2) also are drawn away with the grapple 56 (FIG. 9). In this instance, the tools 81 serve as temporary spring guides or keepers for the coil springs 22 and the washers. The springs 22, moreover, serve to keep an approximately proper longitudinal separation between the grill 14 and the spider 20. Note in this respect that the sleeves 17 remain with the balance of the fuel assembly.

To reassemble the end fitting components on the main portion of the fuel assembly, the end portion 82 of the tools 81 on the grapple 56 are longitudinally aligned with their respective sleeves. The grapple 56 then is moved longitudinally in the direction of the arrow 107 until each of the tools 81 are fully seated in the respective sleeves 17. One or more clamps (not shown in the drawing) hold the lock 21 in suitable position relative to the grooves 44, (FIGS. 2 and 3) and shoulders 45 on the terminal sleeve portion 43. In this condition the air cylinders 95 (FIG. 9) are activated to compress the springs on the spring loaded pins 97, thereby extracting the pins 83 from engagement with the plates that form the cells in the lock 21. The disengagement of the tools 81 and the lock 21 permits the plates that form each of the lock's cells to snap back into the annular recesses 44 (FIGS. 2 and 3) and shoulders 45 in the terminal sleeve portion 43.

The spider 20 (FIG. 9) under the action of the coil springs 22 bears against the adjacent surface of the lock 21. The member 57, moreover, is moved longitudinally in the direction of the arrow 107 to permit the jaws 67, 70 to pivot in clockwise and counter-clockwise directions, respectively. This pivoting movement of the jaws 67, 70 releases the grip that the clamps 73, 74 had on the grill 14. The further clamps (not shown in the drawing) that engage the lock 21 also are removed.

The entire end fitting now is reassembled on the balance of the fuel assembly in a manner that clearly avoids the prior art requirement for tedious, detailed, piece-by-piece disassembly and reassembly. This technique that characterizes the invention also avoids the hazards that might attend the loss of one of these small end fitting components, and the like.

The embodiments of the invention in which an exclusive property or privilege is claimed are defined as follows:

1. In combination with a fuel assembly for a nuclear reactor having a plurality of parallel fuel rods and at least one control rod guide tube maintained in a transversely spaced relationship by means of grid structures through which the fuel rods and guide tube extend, and end fittings engaging the guide tube, improved end fitting means for installing and removing an end fitting as a unit comprising: a hollow cylindrical sleeve, operatively connected to an end of the guide tube in axial alignment therewith, having an end portion extending beyond the end fitting; a cellular grill and a cellular spider assembly, each extending transversely of the sleeve, in longitudinally spaced relationship; bearing means, fixedly positioned on the sleeve, upon which the grill bears for transfering loads between the grill and the sleeve; releasable lock means, disposed superjacent to the spider assembly, selectively engaged with the end portion of the sleeve for restricting movement of the spider assembly beyond the sleeve end portion; spring means, interposed between the grill and the spider assembly, for respectively biasing the grill and spider assembly against the bearing means and lock means; said lock means including a cellular lattice, the lattice sides of at least one of the cells engaging adjacent surfaces of the sleeve end portion; said sleeve end portion having a circumferential groove formed in the outer surface thereof for receiving the adjacent lattice sides to lock the lock means to the sleeve; said lattice sides disposed on the spider assembly for radial displacement relative to the sleeve between a locking position and a disengaged position so as to permit movement of the lock means, spider assembly, spring means and grill, as a unit, relative to the sleeve.

2. An improved fuel assembly according to claim 1 wherein said spring means includes a coil spring, the longitudinal axis of said coil spring being in general alignment with the longitudinal axis of the control rod guide tube.

3. An improved fuel assembly according to claim 1 wherein the sleeve end portion includes at least one longitudinally oriented slot formed therein, said slot permitting said lock means to be selectively engaged and disengaged from said circumferential groove.

* * * * *